(12) United States Patent
Muppidi et al.

(10) Patent No.: US 9,253,210 B2
(45) Date of Patent: *Feb. 2, 2016

(54) POLICY-BASED DYNAMIC INFORMATION FLOW CONTROL ON MOBILE DEVICES

(71) Applicant: International Business Machines Corporation, Armonk, NY (US)

(72) Inventors: Sridhar R. Muppidi, Austin, TX (US); Palanivel Andiappan Kodeswaran, Bangalore (IN); Sougata Mukherjea, New Delhi (IN); Vikrant Nandakumar, New Delhi (IN); Kapoor Shalini, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/781,823

(22) Filed: Mar. 1, 2013

(65) Prior Publication Data

US 2013/0291055 A1 Oct. 31, 2013

Related U.S. Application Data

(63) Continuation of application No. 13/456,843, filed on Apr. 26, 2012.

(51) Int. Cl.
*G06F 21/00* (2013.01)
*H04L 29/06* (2006.01)
*H04W 12/08* (2009.01)

(52) U.S. Cl.
CPC ............... *H04L 63/20* (2013.01); *H04W 12/08* (2013.01)

(58) Field of Classification Search
CPC ..................................................... H04L 63/107
See application file for complete search history.

(56) References Cited

U.S. PATENT DOCUMENTS

| | | |
|---|---|---|
| 7,793,100 B2 | 9/2010 | Arroyo et al. |
| 2004/0111643 A1 | 6/2004 | Farmer |
| 2004/0128394 A1 | 7/2004 | Knauerhase et al. |
| 2006/0224742 A1 | 10/2006 | Shahbazi |
| 2006/0236363 A1 | 10/2006 | Heard et al. |
| 2007/0136098 A1* | 6/2007 | Smythe et al. ............ 705/3 |
| 2009/0178108 A1 | 7/2009 | Hudis et al. |
| 2009/0228953 A1 | 9/2009 | Hu et al. |
| 2009/0228954 A1 | 9/2009 | Hu et al. |
| 2009/0228956 A1 | 9/2009 | He et al. |

(Continued)

FOREIGN PATENT DOCUMENTS

WO  WO2007048013  4/2007

OTHER PUBLICATIONS

Security Note, Blackberry Device Software Securing Devices for Personal Use and Work Use Version: 6.0, Oct. 7, 2011, p. 1-18.

(Continued)

*Primary Examiner* — Christopher Brown
(74) *Attorney, Agent, or Firm* — Joseph Petrokaitis; David H. Judson

(57) ABSTRACT

A method for securing data on a mobile device that supports both enterprise and personal applications. According to the method, information flows and data accesses are tracked on the device at run-time to enable access control decisions to be performed based on a policy, such as an enterprise privacy policy that has been distributed to the device from an enterprise server. The policy may be updated by events at the device as well as at the enterprise server.

7 Claims, 4 Drawing Sheets

(56) References Cited

U.S. PATENT DOCUMENTS

| | | | |
|---|---|---|---|
| 2010/0064341 A1 | 3/2010 | Aldera | |
| 2010/0146269 A1* | 6/2010 | Baskaran | 713/165 |
| 2010/0212010 A1 | 8/2010 | Stringer et al. | |
| 2011/0055841 A1 | 3/2011 | Senno et al. | |
| 2012/0137369 A1* | 5/2012 | Shin et al. | 726/25 |
| 2012/0303476 A1* | 11/2012 | Krzyzanowski et al. | 705/26.5 |

OTHER PUBLICATIONS

PCT/JP2013/002521, International Search Report and Written Opinion, Jul. 2, 2013.

Enck et al, "TaintDroid: An Information-Flow Tracking System for Realtime Privacy Monitoring on Smartphones," 9th USENIX Symposium on Operating Systems Design and Implementation (OSDI'10), Oct. 2010.

Jagtap et al, "Preserving Privacy in Context-Aware Systems," Proceedings of the Fifth IEEE International Conference on Semantic Computing, Oct. 2011.

"Mobile Phone Security," Systems and Internet Infrastructure Security, 2010.

"Securing end-user mobile devices in the enterprise," IBM Global Technology Services White Paper, Apr. 2011.

* cited by examiner

POLICY-BASED DYNAMIC INFORMATION FLOW CONTROL ON MOBILE DEVICES

BACKGROUND OF THE INVENTION

1. Technical Field

This disclosure relates generally to information security and, in particular, to a policy-based approach to secure enterprise data on mobile devices.

2. Background of the Related Art

The recent past has seen an enormous growth in the usage and capabilities of mobile devices, such as smartphones, tablets, and the like. Such devices comprise fast processors, large amounts of memory, gesture-based multi-touch screens, and integrated multi-media and GPS hardware chips. Many such devices use open mobile operating systems, such as Android. The ubiquity, performance and low cost of mobile devices have opened the door for creation of a large variety of mobile applications.

Enterprises are now providing their workforce with mobile devices to enable them to work from anywhere. In addition, enterprise employees also are using their personal mobile devices to connect to enterprise networks to enable them to work from remote locations. Under these scenarios, enterprises need to consider the implications of mobile devices on enterprise security and, more specifically, they need to ensure that sensitive enterprise data does not leak through these devices. This is a complex problem for which, currently, there are no adequate solutions.

Thus, for example, in a typical use scenario, an end user runs both enterprise and personal applications concurrently on a smartphone. This operating scenario presents many potential problems. Because these devices do not include on-device mechanisms for controlling resident data usage, and because users have no control over data once they authorize access by their resident applications, there is no way to protect sensitive enterprise data from arbitrary application and modifications. Further, because (from the device's perspective) all applications are assumed to be equal, there is no way to prevent information leakage between enterprise and personal applications. Indeed, this information leakage is exacerbated by open interface mobile operating systems (such as Android), which are designed to allow data sharing among applications. Further, because mobile device operating systems can be jail-broken or otherwise rooted to override existing security mechanisms and install malicious software, there is no effective way to manage the integrity of software running on the device. Indeed, because end users can download and install virtually any application without knowledge of the application's security behavior, it is very difficult to control applications (or their runtime behavior) once installed on the device.

As a result, when mobile devices support both enterprise and personal applications, there is a high likelihood that sensitive enterprise data leaks through the personal applications. In this scenario, the enterprise has no guarantee that its sensitive data will not be used by the personal application. The problem may be exacerbated if enterprise applications from multiple different enterprises are running on the device (such as where the user is a service provider for multiple such entities). In this scenario there is a further need to protect the enterprise applications from one another. Further, often there are no trust guarantees on the device, which presents the possibility that the device itself may be running rogue system software that has the potential to leak sensitive data outside the device.

BRIEF SUMMARY

According to this disclosure, a method is provided for securing data on a mobile device that supports both enterprise and personal applications. According to the method, information flows and data accesses are tracked on the device at run-time to enable access control decisions to be performed based on a policy, such as an enterprise privacy policy that has been distributed to the device from an enterprise server. The policy may be updated by events at the device as well as at the enterprise server.

In one embodiment, a method is operative on a mobile device to enforce an enterprise policy. The method begins by receiving and storing the enterprise policy, which is typically one of: a static policy that defines an attribute that must be verified before permitting an enterprise application to access enterprise data, and a dynamic policy that defines a run-time behavior that must be satisfied before permitting an enterprise application to access the enterprise data. The method continues during run-time to enforce the policy as needed. Thus, for example, in response to an application seeking access to enterprise data stored in the mobile device, the policy is retrieved. A determination is then made regarding whether a context identified in the policy is satisfied. If the context identified in the policy is satisfied, the application is an enterprise application that is permitted to access the enterprise data, and such access is then permitted. For further security, the enterprise data may be encrypted in the mobile device. Thus, if the context identified in the policy is satisfied, the enterprise data is first decrypted before being provided to the enterprise application. The enterprise policy may be updated based upon a trigger event that occurs at the mobile device, or at an enterprise server.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
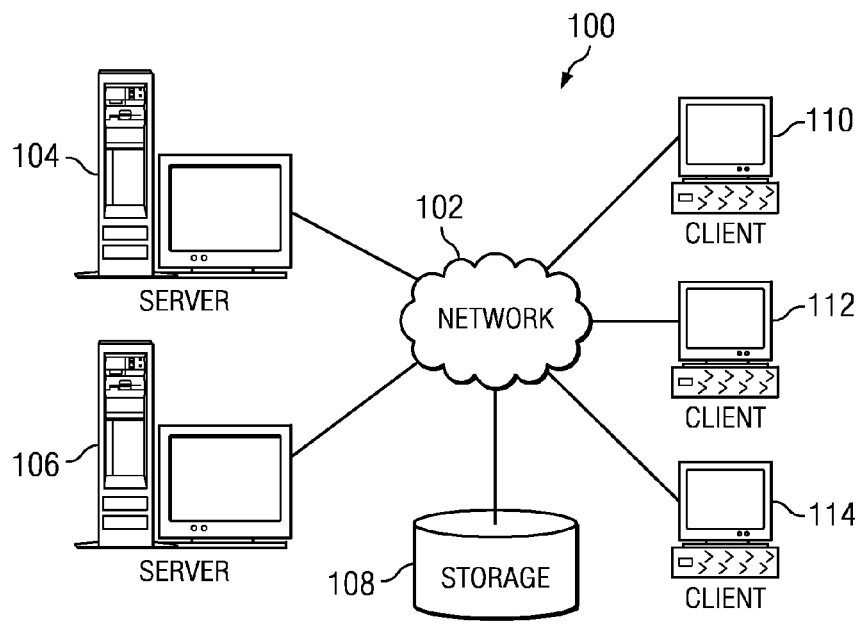
FIG. 1 depicts an exemplary block diagram of a distributed data processing environment in which exemplary aspects of the illustrative embodiments may be implemented.
Figure 2:
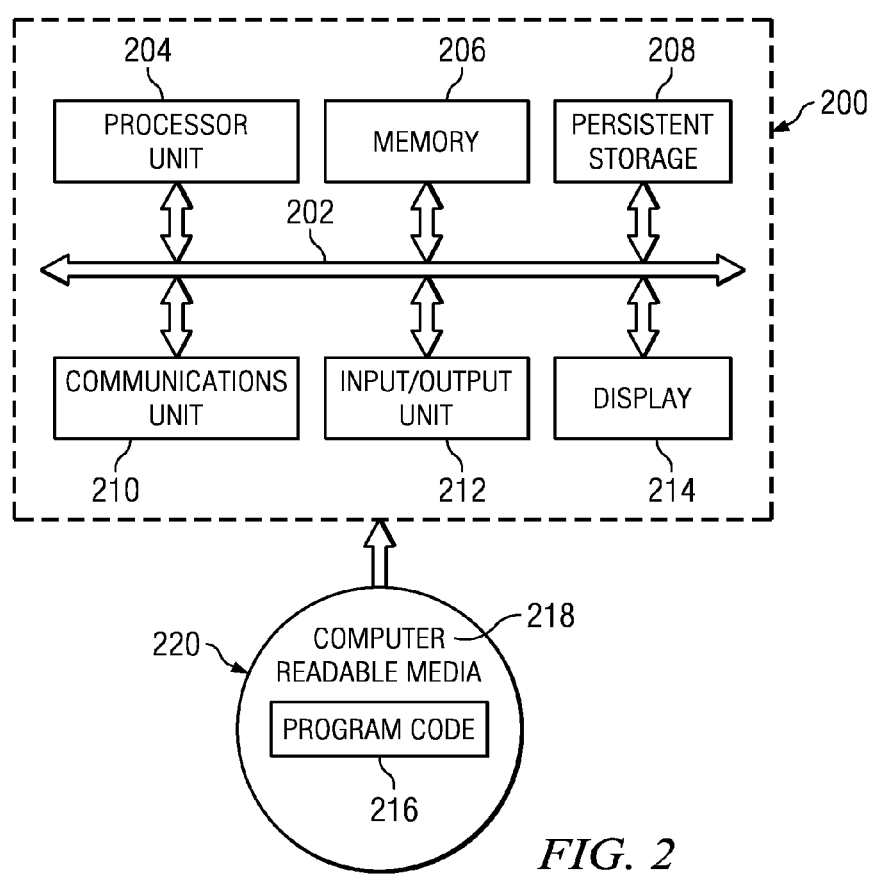
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Mobile Device Technologies

Figure 3:
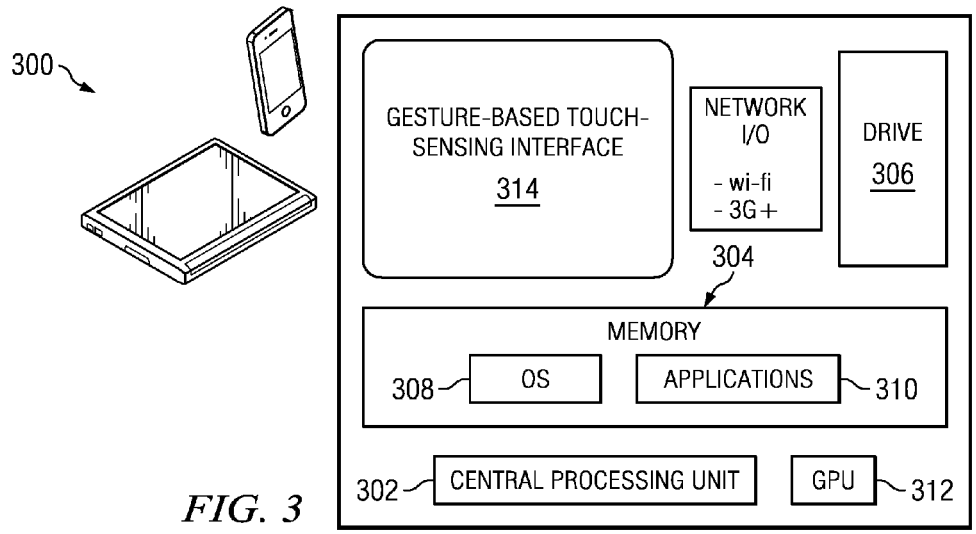
FIG. 3 illustrates a representative mobile device in which the disclosed subject matter may be implemented.

Mobile device technologies also are well-known. A mobile device is a smartphone or tablet, such as the iPhone® or iPad®, an Android™-based mobile device, or the like. As seen in FIG. 3, a device 300 of this type typically comprises a CPU 302, computer memory 304, such as RAM, and a data store 306. The device software includes operating system (e.g., Apple iOS, Android, Blackberry OS, or the like) 308, and generic support applications and utilities 310. Typically, the device includes a separate graphics processing unit (GPU) 312. A touch-sensing device or interface 314, such as a touch screen, is configured to receive input from a user's touch and to send this information to processor 312. The interface 314 responds to gestures on the touch sensitive surface. Other input/output devices include software-based keyboards, cameras, microphones, and the like.

More generally, the mobile device is any wireless client device, e.g., a cellphone, pager, a personal digital assistant (PDA, e.g., with GPRS NIC), a mobile computer with a smartphone client, or the like. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Thus, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices. The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Enterprise Policy Management

Figure 4:
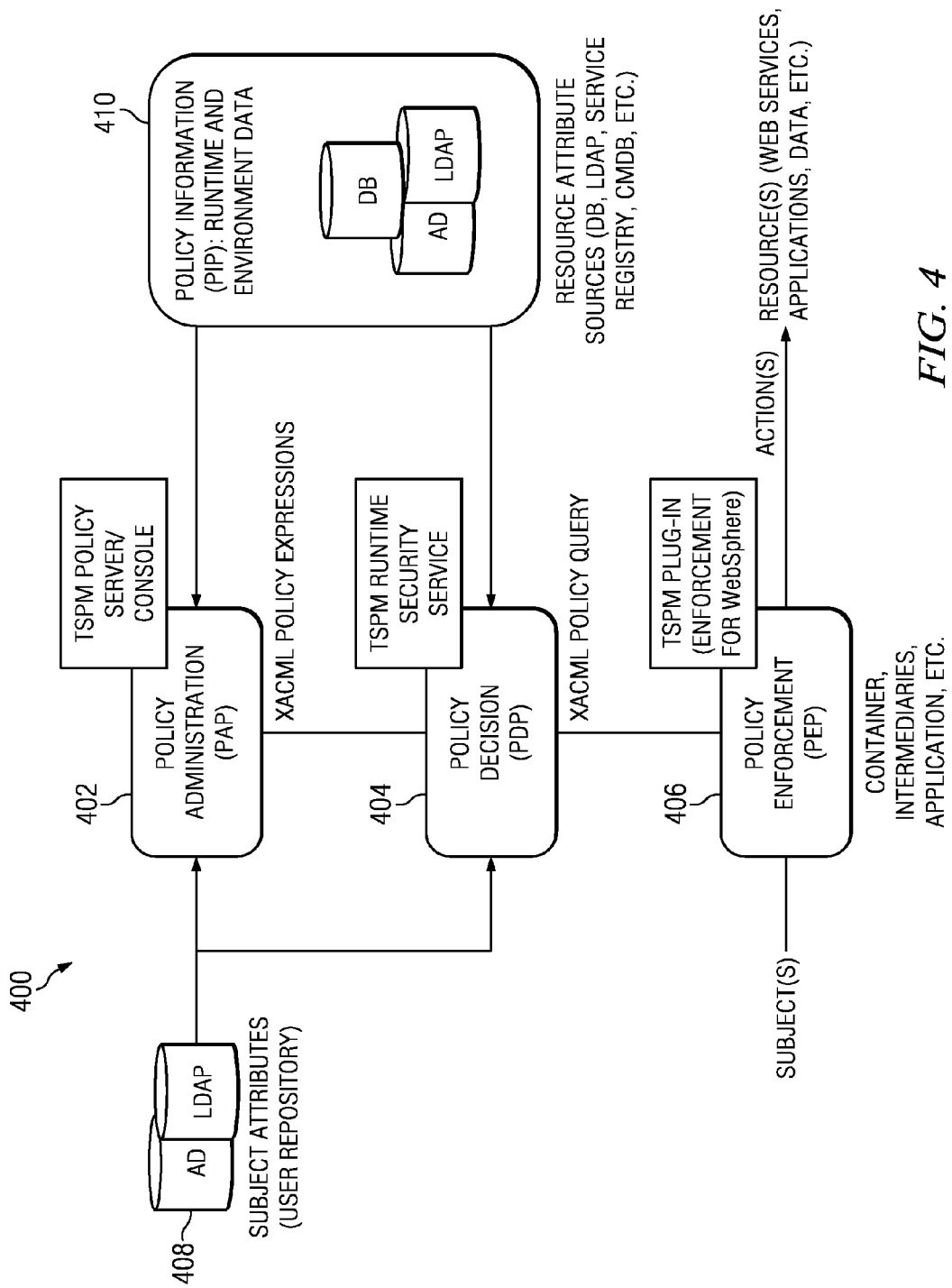
FIG. 4 illustrates a representative enterprise policy management system for authoring, distributing and enforcing enterprise policies, such as an enterprise privacy policy.

FIG. 4 illustrates a representative enterprise policy management system 400 that is known in the art. The system 400 may be implemented across one or more machines operating in a computing environment, such as shown in FIG. 1. Typically, the system comprises a policy administration point (PAP) 402, the policy decision point (PDP) 404, and a policy enforcement point (PEP) 406. Generally, the policy administration point 402 is used to define a policy, which may be specified as a set of XACML policy expressions. This policy uses subject attributes provided from a user repository 408, as well runtime and environment data received from policy information point (PIP) 410. The policy decision point (PDP) 404 receives similar information and responds to an XACML policy query received from the policy enforcement point (PEP) 406 to enforce the policy on a subject and with respect to a particular action initiated by the subject. The PDP 404 implements the policy decision. In one commercial implementation of this approach, the PAP 402 is implemented by IBM® Tivoli® Security Policy Manager (TSPM) policy service/console, the PDP 404 is implemented in the TSPM runtime security service, and the PEP is implemented as a TSPM plug-in to application server, such as IBM WebSphere® Application Server.

The policy management system may be implemented using one or more computing machines, such as shown in FIG. 2.

The policy administration point typically includes a web-based user interface by which an enterprise privacy policy may be authored and distributed.

Policy-Based Dynamic Information Flow Control on Mobile Devices

With the above as background, the subject matter of this disclosure is now described.

According to this disclosure, it is assumed that end users operate mobile devices that support both enterprise applications, as well as personal applications. As used herein, an "enterprise" application is an application that includes an application adapted to be executed in an enterprise computing environment using an access component that resides on the end user mobile device. The enterprise environment may be broadly construed as hardware and software computing resources (including those that are potentially cloud-based) that are within the administrative and management domain of the enterprise. The physical location of the enterprise application is not limited to any particular facility, location, or the like. An end user of a mobile device receives and installs an access component that enables the user of the mobile device to access the server-side of the enterprise application. This basic operation is described above with respect to FIG. 1. A "personal" application is any application that is not an enterprise application. Typically, a personal application is one that is available on the device as configured and provided to the end user, or it may be application that is downloaded and installed on the device thereafter. A typical personal application is one that is purchased or otherwise obtained from an application store, a web site, or otherwise.

An information label (or "tag") may be associated with information on the device. Thus, a particular label may indicate that the information is "private" (meaning, for example, that it is associated with an enterprise application) "public" (meaning, for example, that it is not associated with an enterprise application), or otherwise. The information label itself may be static or dynamic, and a given enterprise policy may take into consideration an information label.

The enterprise operates a policy management system, such as described above with respect to FIG. 4. The policy management system supports the authoring and distribution of both "static" and "dynamic" policies. As used herein, a static policy is one that uses some form of application attribute to determine which applications on a mobile device can access enterprise sensitive data; typically, the application attribute is one that is invariant (or invariant over a given time period), such as a hash that is computed or computable over the application itself. A representative hash may be computed by applying a cryptographic function (e.g., MD5, SHA-1, or the like) to the application to generate a digest that uniquely identifies the application. A static policy thus may define the application by its hash digest, which must then be computable on the mobile device in order for the mobile device to be able to access enterprise sensitive data using that application. In contrast, a dynamic policy is one that determines system run-time behavior, typically when multiple applications (e.g., enterprise and personal applications) execute on the device concurrently. Thus, without limitation, a dynamic policy may determine which groups of applications can run together, which device capabilities should be turned off based on currently active applications, device location, or other operating parameters or conditions, which data cannot be shared among currently running applications, which resources (including, without limitation, directories and files) cannot be accessed by an application as long as another group of applications is running, and so forth.

Figure 5:
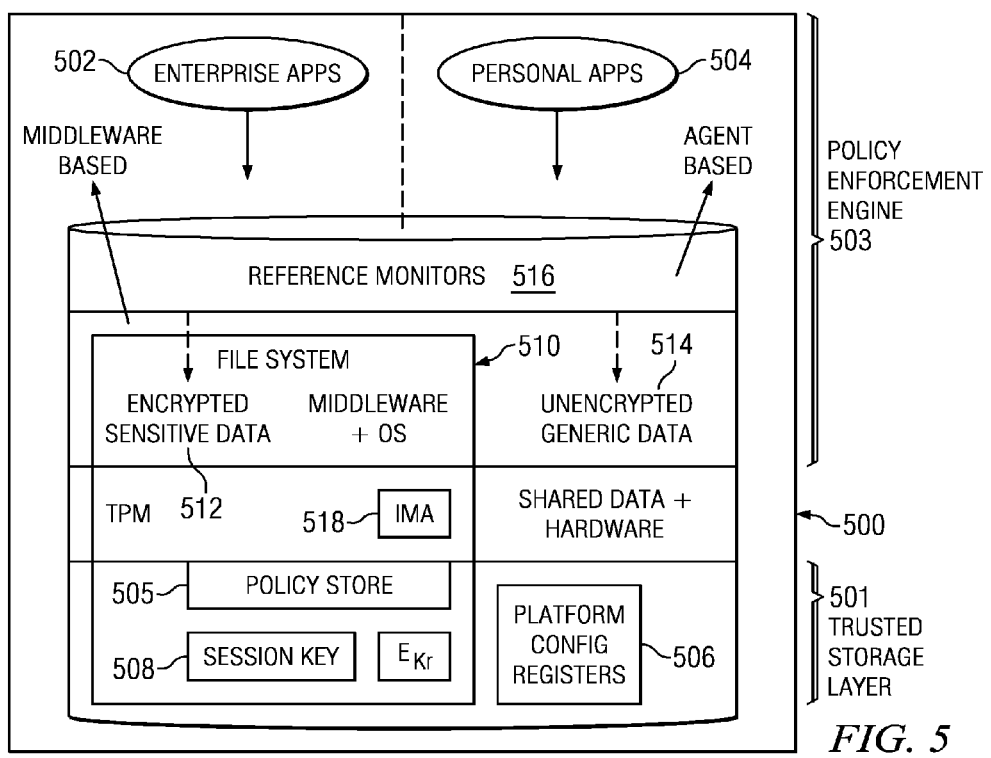
FIG. 5 illustrates a mobile device security platform and framework according to this disclosure.

FIG. 5 illustrates system architecture that implements policy-based information flow control on a mobile device. The mobile device 500 is of the type shown in FIG. 3, and it is assumed that the mobile device executes one or more enterprise applications 502, and one or more personal applications 504. As described above, it is desirable to enforce one or more enterprise policies with respect to the mobile device in general and with respect to these applications in particular. To this end, the system architecture comprises a trusted storage layer 501, and a policy enforcement layer 503. The trusted storage layer 501 includes protected memory 506, e.g., platform-configured registers or the like, in which one or more session keys 508 are stored securely. The trusted storage layer 501 comprises a trusted platform module (TPM) which also stores one or more policies 505 that have been authored at a policy server and delivered securely to the mobile device. A session key 508 is received securely from an enterprise server and is used to encrypt device-resident sensitive data. Preferably, the session key 508 is changed periodically, for example, each time the device initializes to the enterprise server. The session key used for encryption may be such that it expires after a given time-out such that access to sensitive data is located until the session key is refreshed (e.g., by contacting the enterprise server); this protects sensitive data even if the device is lost. The device file system 510 stores encrypted sensitive data (i.e., enterprise data encrypted by using the session key) 512, as well as unencrypted generic data 514. One or more reference monitors 516 interface the one or more enterprise applications 502 and the one or more personal applications 504 to the policy enforcement layer 503. A representative reference monitor is described in U.S. Pat. No. 7,793,100, the disclosure of which is incorporated herein by reference. A reference monitor tracks information flow on the device and provides one or more control functions. Preferably, the device also includes an integrity measurement agent 518, which typically is software that is used to compute a hash of an application that can then be verified for integrity. The integrity measurement agent 518 may comprise part of the trusted platform module (TPM) or be distinct from that module.

In general, an enterprise server creates and signs a policy (e.g., a privacy policy) and sends it securely to the mobile device, which stores the policy in the trusted storage layer or otherwise in the TPM. At system boot (or otherwise), the policy is read and enforced by the policy enforcement layer. When it is desired to update a policy stored on the device, the enterprise server may first request a remote integrity measurement of the device, e.g., to ensure that no rogue software is running, to ensure that a particular enterprise application is present, or the like. The integrity measurement agent performs the necessary check and reports the results back to the enterprise server. After verification of the device's integrity (e.g., that each computed hash is recognized as a permitted application, that a particular hash of an enterprise application is present, or the like), the enterprise server then provides the mobile device the updated policy (preferably digitally signed and transmitted securely), which policy is then stored securely in the TPM. The system can then reconfigure to enforce the new policy (using the policy enforcement layer) going forward. Policy updates may be triggered by events both at the mobile device and/or the enterprise server.

The policy enforcement layer 503 provides run-time enforcement of one or more static and/or dynamic enterprise policies. The nature and scope of such policies may be quite varied. A typical enterprise policy is a privacy policy, but this is not a limitation.

The policy enforcement layer performs one or more of the following basic operations: monitors information flows on the device at run-time, updates a policy based on one or more triggers from the enterprise server as well as on the mobile device (e.g., starting and exiting of an application, storage of certain data on the device, or the like), updates a policy based on one more user-context triggers (e.g., change of location, change of calendar schedule, or the like), and enforces the one or more enterprise policies, preferably at the device middleware layer. The nature and scope of a particular policy may be quite varied, and this disclosure is not intended to be limited to any particular policy. In one embodiment, the policy enforcement layer operates to enforce context-based dynamic policies. Thus, for example, a representative policy may be such that it turns off certain device capabilities based on a current context defined by currently-executing applications. Another representative policy may be such that it causes one or more applications to hibernate when a higher priority security application begins to run. Yet another policy might be enforced by the policy layer to prevent certain service accesses at run-time based on a current context. Still another policy may require the TPM to attest (to a trusted third party) to platform (or application) integrity. Another policy may be such that is requires an enterprise-provided session key to encrypt enterprise session data.

Figure 6:
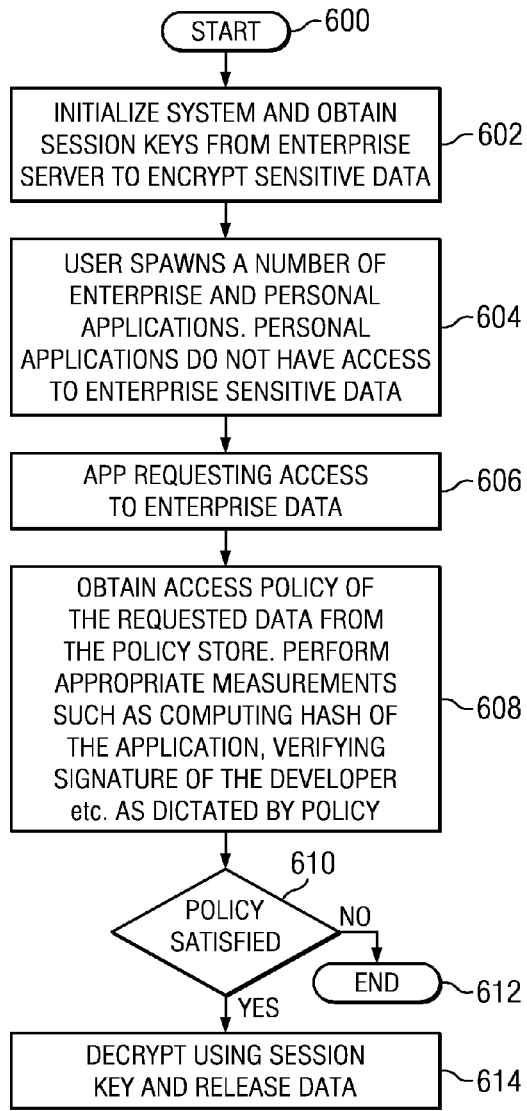
FIG. 6 illustrates a process flow for enforcing a static policy on the mobile device using the mobile device security framework of this disclosure.

FIG. 6 illustrates a representative flow diagram for a static policy that prevents access to enterprise data except upon a successful device integrity check. The nature of integrity check is defined in the policy and may be quite varied, e.g., that there are no rogue applications on the device, that a particular enterprise application hash has been computed and verified, that a developer signature associated with an application is verified, and the like. In this example, the routine begins at step 600. At step 602, the system is initialized. At this step, the device connects to the enterprise server and, following an authentication, obtains one or more session keys. These keys may be present already in the device. At step 604, one or more enterprise applications, and one or more personal application are spawned on the device. At step 606, a reference monitor determines that an application requests access to enterprise data. This access may be based on an action taken by the end user, by the system, or otherwise. The routine continues at step 608 by obtaining and applying a policy. This step may involve retrieving the policy from an internal policy store (on the device), retrieving the policy from an external policy store (located external to the device), or the like. This static policy requires an integrity check, as has been described. Thus, at step 608, the integrity check specified in the policy is performed. At step 610, a test is carried out to determine if the policy has been satisfied. If not, the routine ends at step 612. Step 612 may also include providing an error message to the user, reporting the event to the enterprise, logging the activity, or the like. If, however, the policy is satisfied, the routine continues at step 614 to decrypt the required enterprise data and release it to the enterprise application. The enterprise data is then managed (processed, used, transmitted, and so forth) as needed by the enterprise application.

Figure 7:
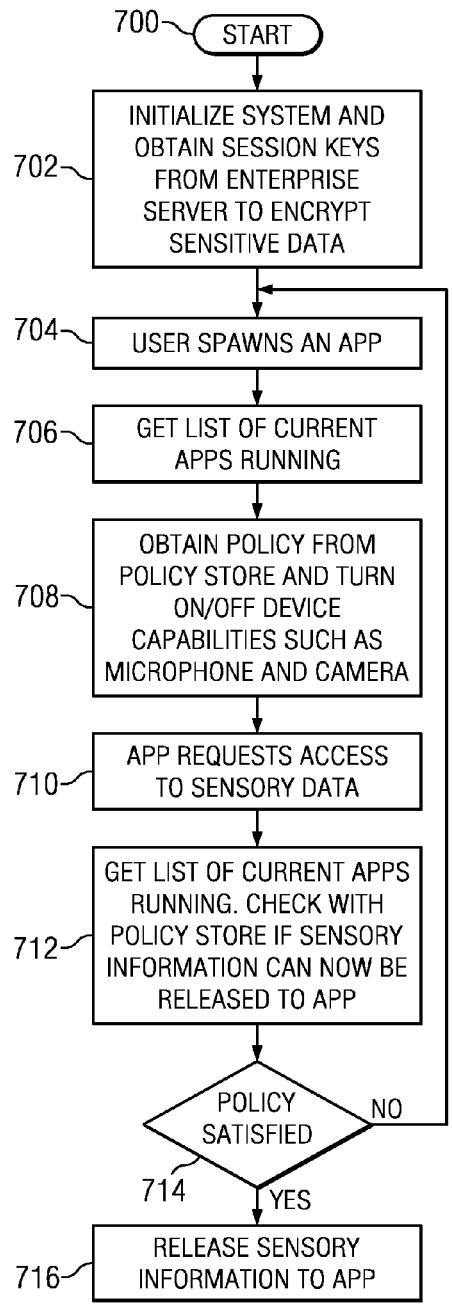
FIG. 7 illustrates a process flow for enforcing a dynamic policy on the mobile device using the mobile device security framework of this disclosure.

FIG. 7 illustrates a representative flow diagram for a dynamic policy that prevents a particular application from accessing certain data (e.g., sensory data input to the device from a user gesture) based on some run-time execution context. As described above, the nature of run-time execution context is defined in the policy and may be quite varied, e.g., that certain applications or groups of application can run together, that certain device capabilities should be turned off based on currently active applications, that certain data cannot be shared among currently executing applications, that certain files or sensors cannot be accessed by an application if another application is running, and so forth. In this example, the routine begins at step 700. At step 702, the system is initialized. At this step, the device connects to the enterprise server and, following an authentication, obtains one or more session keys. As described above, these keys may be present already in the device. At step 704, an application is spawned on the device. At step 706, a list of current applications running on the device is obtained (e.g., by the one or more reference monitors). The routine continues at step 708 by obtaining and applying a policy. This step may involve retrieving the policy from an internal policy store (on the device), retrieving the policy from an external policy store (located external to the device), or the like. In this example, the dynamic policy turns on or off one or more device capabilities based on the list of current applications running.

The routine continues at step 710 with an application (which may or may not be an enterprise application) requesting access to sensory data, such as data generated by a user gesture, data captured by a device resource, or the like. At step 712, and using the list of current applications running, the policy is checked to determine whether the sensory information can be released to the application that is spawned in step 704. A test is performed at 714 to make this determination. If the outcome of the test is negative, the routine cycles back to step 704. Step 714 may also include providing an error message to the user, reporting the event to the enterprise, logging the activity, or the like. If, however, the policy is satisfied, the routine continues at 716 to release the sensory information to the application so that processing can continue.

As noted above, in the process of enforcing a policy (such as described in FIG. 6, or FIG. 7), the policy enforcement decision may be based in whole or in part on information labels that identify particular data as "private" or "public" or the like.

The trusted platform module may be a standalone module that is downloaded and installed in the mobile device, or it may be native to the device. In a particular embodiment, the trusted platform module comprises hardware, operating system and software resources that are necessary to implement the trusted storage and policy enforcement layers as described herein. A trusted platform module may include appropriate cryptographic routines to generate cryptographic hashes, to store and manage session keys, to interact with external trusted routines and devices, and the like. While symmetric cryptographic routines have been described (wherein the same key is used for both encryption and decryption), this is not a limitation. The enterprise data may be encrypted and decrypted using other techniques, such as public key cryptography.

As one of ordinary skill in the art will appreciate, the technique shown in FIG. 7, which is merely representative, provides an effective way of constraining information flows at run-time to prevent data leakage between enterprise and personal applications executing on the mobile device.

The subject matter described herein has significant advantages over the prior art. It enables multiple end user personas to be created and enforced on the same mobile device. Using the approach, sensitive data on a mobile device can be protected from access or modification by arbitrary applications. One or more enterprise security policies may be enforced on the mobile device, even if that device is used for personal (non-enterprise) activities. The solution enables both static and dynamic policies to be enforced on the device, and it enables dynamic change of policies at run-time, e.g., based on external factors. The technique enables integrity checking of the device (or some application executing therein) before enterprise data is released to an application executing on the device. This approach ensures that data leakage between enterprise and personal applications is prevented. As a consequence, end users may be trusted to use their own personal devices even to support use with enterprise (or cloud-based) applications.

As noted above, the particular enterprise policies that may be implemented are not limited. Several example policies were described above in FIG. 6 and FIG. 7. While these policies have been described in the context of restricting access to data on the device itself, this is not a limitation. Another representative policy restricts mobile device access to sensitive enterprise data on an enterprise server if the access occurs over a public WiFi network. Yet another such policy restricts mobile device access to personal data on the device if the access occurs over an enterprise network. Of course, these example policies are merely representative.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. The policy management system or components thereof may be hosted in the cloud.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the device-specific policy enforcement functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the device-specific components are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

Further, the policy management functionality provided herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, a "client-side" application should be broadly construed to refer to an application, a page associated with that application, or some other resource or function invoked by a client-side request to the application. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Having described our invention, what we now claim is as follows:

1. A method operative on a mobile device to enforce an enterprise policy, the mobile device including a hardware element and being configured to execute both enterprise and personal applications, the enterprise policy configured to prevent enterprise data from being leaked to a personal application running in the mobile device, comprising:

receiving and storing in a data store an enterprise policy defining a permitted run-time execution context when multiple applications execute concurrently on the mobile device;

responsive to an application seeking access to enterprise data stored in the mobile device, retrieving the enterprise policy, together with a list of applications currently running on the mobile device;

determining, based at least in part on the list of applications currently running on the mobile device, whether the run-time execution context identified in the enterprise policy is satisfied;

when the run-time execution context identified in the enterprise policy is satisfied, releasing to the application sensory data captured from a user input to the mobile device and enabling the application to access the enterprise data;

wherein at least the determining step is carried out in software executing in a hardware element.

2. The method as described in claim 1 further including:
receiving and storing a key; and
using the key to encrypt the enterprise data.

3. The method as described in claim 2 further including:
when the run-time execution context identified in the enterprise policy is satisfied, applying the key to decrypt the enterprise data; and
providing the enterprise data to the application.

4. The method as described in claim 1 further including updating the enterprise policy.

5. The method as described in claim 4 wherein the enterprise policy is updated upon a trigger event at one of: the mobile device, and an enterprise server.

6. The method as described in claim 4 wherein the updating step includes executing an integrity check at the mobile device prior to permitting update to the enterprise policy.

7. The method as described in claim 1 wherein the enterprise policy is one of: a static policy that defines an attribute that must be verified before permitting the application to access the enterprise data, and a dynamic policy that defines a run-time behavior that must be satisfied before permitting the application to access the enterprise data.

* * * * *